United States Patent Office 3,698,911
Patented Oct. 17, 1972

3,698,911
PROCESS FOR THE PRODUCTION OF DRY MOLASSES FROM SUGAR-CANE OR BEET-ROOT MOLASSES
Armando Paulo Pellegrini, 1329 Rue Ouro Preto, Belo Horizonte, Brazil
No Drawing. Filed Dec. 9, 1970, Ser. No. 96,572
Int. Cl. A23k 1/02
U.S. Cl. 99—6                                   10 Claims

ABSTRACT OF THE DISCLOSURE

A process for producing dry solid molasses comprising adjusting the pH of liquid molasses to about 8–10.5 at temperatures of about 60–70° C. and drying the mixture.

BACKGROUND OF THE INVENTION

This invention relates to a process for the production of molasses in the solid state, which is soluble in water, containing substantially no inert or filler substances.

The invention is based on the principle of disconnecting linear non-crystallizable sugar molecules from one another with no deleterious side-effects (e.g., taffying, decomposition, carbonization) on their intrinsic properties.

As is well known, certain sugars are crystallizable and others are not.

In the production of saccharose from sugar-cane or beet-root, the raw sugar obtained is composed of both crystallizable and non-crystallizable substances which may or may not be inverted.

When separation of the sugars is achieved by centrifugation, the tailings which is termed molasses still have their own special characteristics, within certain limits, which are dependent upon the varieties of sugar-canes employed, or the soils where they are grown.

These molasses are dark liquid substances, which are non-crystallizable through normal methods, being highly viscous, easily fermented or inverted, rich in carbon, hydrates, mucilages, certain vitamins and amino-acids.

The molasses product, sometimes referred to as "in natura" has had since antiquity a great deal of uses such as in the production of ethylic alcohol, feedstuffs for animals (being an outstanding source of energy in this case, baking powder, acetic acid, proteinaceous based materials, and even fertilizer when produced in large quantities.

Nevertheless, the alimentation of animals with such a product (which should be its most widespread use due to its peerless source of energy) has so many drawbacks, mainly in countries where there is no rapid system of distribution, that its use as a feedstuff for animals has been very restricted up to the present times.

Despite these difficulties, however, intense studies have been undertaken, especially with oxen, in which the value of the product is enhanced by combining it with synthetic urea. By so doing it becomes an excellent proteinaceous feed material. At the present time, the mechanisms involved in the molasses/urea reaction are well known.

Although there is no possibility of proteinaceous transformations in monogastric animals, molasses has a decided importance particularly in the fattening of such animals as swines, gallinacean, and ovines due to its intense source of energy.

The most serious limitations in the intensive and far-reaching use of molasses have been: transportation, stockpiling, handling and continuity.

The solutions to such problems heretofore required expensive equipment, which generally led to excessive wastes, thereby rendering the product so expensive that it was non-competitive with other materials.

The use of mixtures such as husks-molasses and tarts-molasses have always been self-defeating due to the fact that the intrinsic value of molasses is decreased considerably.

These mixtures, however, have been widely used because they have constituted the only possible vehicles for molasses, even though the inert filler causes a considerable devaluation of the product as a food. Such mixtures have been in use for a hundred or more years.

There have been many other serious limitations in the utilization of the product "in natura" as a feedstuff for animals.

Difficulties in transportation, serious problems concerning stocking which would sometimes demand the construction of expensive buildings, uncontrollable fermentation, and principally the inconstancy of distribution, especially for confined animals, to whom conditioning is an important factor in that its interruption may cause serious alterations in the confining process, are further drawbacks associated with the use of molasses as a feedstuff.

All of the above problems have plagued those workers in the prior art attempting to develop a technique for the utilization of molasses in an efficient manner.

The process of the present invention solves all the problems we have mentioned above. The product of the present invention is not comparable with any heretofore produced.

There is no comparison which can be drawn between dry molasses and the product, "in natura," since solid molasses, due to the method of its production is a unique product whose characteristics are clearly superior to those of molasses, because of the presence therein of mineral elements, e.g., calcium, phosphorus, micro-elements, at incomparable levels which are also accurately balanced.

The product is solid, soluble in water, and non-fermentable in the dry state. It contains no inert filler or carrier substances.

Sugars contain calcium and phosphorus linkages. The portion that is not soluble in water is composed of calcium-phosphates.

DESCRIPTION OF THE PROCESS

The basis of the process of the present invention is drying of molasses in an alkaline medium.

Molasses does not dry when it is heated, and if an extra supply of heat is furnished it will carbonize, losing in this manner, all its valuable properties.

When organic or mineral acids, even those having small constants of ionization are added, the process of carbonization will be hastened, even at normal temperatures.

Thus, it can be concluded that molasses does not dry in an acid or neutral pH; however, if instead of an acid, an alkaline substance is added, and a pH of from about 8.5 to 10.5 (depending on the constitution of the molasses) is reached, the resulting product can easily be dried and transformed into powder.

This dry material still has an alkaline pH; however, if a careful neutralization is performed, by means of an acid-salt or an acid, the final pH will be from about 6.8 to about 7.2, and the resulting product will remain in the solid state, being easily soluble in water. Upon dissolution in an approriate amount of water, the orginal molasses is regenerated.

To carry out the process of the invention, molasses which has been heated to a temperature of about 60–70° C. and a calcium hydroxide (preferably having a particle size of about 150 mesh) slurry are supplied to a suitable mixing apparatus or centrifugal pump. The mixture preferably contains from 6–8% by weight of calcium hydroxide. In any event, sufficient calcium hydroxide is supplied to maintain a pH of about 8 to about 10.5. Upon completion of the reaction, the solids concentration of the mixture is preferably adjusted to about 70% by weight, i.e., by evaporation.

The resulting product is then further dried to powder form. This drying is preferably accomplished by means of a spray-drying technique.

The spray-dried product is then neutralized to a pH of 7 by admixture with an acid or acid salt. Exemplary of suitable neutralizing agents are mono-calcium phosphate, phosphoric acid (finely dispersed). An amount of 4–5% mono-calcium phosphate or 2.5–3.5% of phosphoric acid based on the weight of the dried molasses is usually sufficient to achieve neutralization. It is to be understood, however, that any suitable acidic material may be employed for neutralization. The resulting product is then suitable for packaging and delivery.

The average chemical composition of a typical final product is given in Table 1.

TABLE 1

| | Wt. percent |
|---|---|
| Total sugars | 56–64 |
| Proteins | 2.98 |
| $Fe_2O_3$ | 0.79 |
| CaO | 7.91 |
| MgO | 0.58 |
| $SO_4$ | 1.10 |
| $P_2O_5$ | 2.24 |
| $K_2O/Na_2O$ | 1.76 |
| Co-Cu-Ma-Zn-(micro-elements) | Trace |

The product provides 3.200 kcal./kg.

X-ray analysis showed that a portion of the calcium, phosphorus, and iron, are linked to the sugar content, that is to say, to the soluble fraction of the product.

These analyses also showed that the insoluble fraction consists of calcium phosphates and that there is no iron immobilizing phosphorus.

Thus, it can be inferred that the sugars are linked to high levels of iron-calcium-phosphorus, which increases the nutritive value of the product and also eliminates the laxative tendency of pure molasses, as experiments with oxen and swines have attested.

The addition of micro-elements such as cobalt, copper, manganese and zinc (through their respective sulphates) enhances the metabolic and nutritive value of solid molasses product.

EXAMPLES

Example 1.—Palatability experiment (oxen)

This experiment was undertaken at Escola de Veterinaria da Universidade Federal de Minal Gerais.

Number of animals: 12
1st ration:
    Concentrated—1 kg.
    Dry molasses—500 gr.
2nd ration: Concentrated—1 kg.

The rations were placed simultaneously in separate hods. The behavior of three groups of animals were observed: One group consumed the concentrated first. A second group consumed the ration containing dry molasses first. A third group consumed indiscriminately both the first and second rations. The two mixtures were rapidly consumed, revealing a good acceptance of dry molasses by the oxen.

Example 2.—Tolerance level experiment (oxen)

This experiment was carried out at the Escola de Veterinaria da Universidade Federal de Minal Gerais. The steers were daily fed with grass hay, and 4 kg. of concentrated molasses. The proportion of dry molasses to concentrated molasses was changed every other day, so that, there was an increase of 500 gr. dry molasses, relative to the former level, every 48 hours. This was continued until a concentrate containing 4 kg. of dry molasses was daily consumed by every animal.

During the final period, 5 kg. of pure molasses was supplied. The molasses was rapidly eaten by the animals, in all the quantities presented. It was observed that the coat improved considerably, and that the faeces presented a normal appearance.

Example 3.—Palatability experiment (swines)

This experiment was carried out at the Escola de Veterinaria da Universidade Federal de Minal Gerais.

Duration: 2 weeks

The animals were given rations, in which the proportion of dry molasses varied from 15%–30% to 60% corn. A perfect acceptance of the product was noted during this experiment.

Example 4.—Tolerance levels—experiment (swines)— gain in weight

This experiment was carried out at the Escola de Veterinaria da Universidade Federal da Minas Gerais. The experiment was conducted according to the method set forth in Example 3. During the 2-week period, the average gain in weight was a bit greater than 1 kg./day per animal. When a level of 60% dry molasses was reached, diarrhea was observed, but it did not affect the acceptance of the material by the swine or the gain in weight.

Example 5.—Field experiment (swines)

This experiment was conducted at Fazenda do Moinho Velho (Moniho Valho Farm).

EXPERIMENT (A)

| | Animals treated | Days | Dry molasses ration (Gr.) | Average weight gain per day (Gr.) |
|---|---|---|---|---|
|  | 100 | 30 | 100 | 11.760 |
| Control | 20 | 30 | 0 | 6.000 |

EXPERIMENT (B)

| | Animals treated | Dry molasses ration (Gr.) | Average weight gain per day (Gr.) |
|---|---|---|---|
|  | 100 | 200 | 900 |
| Control | 20 | 0 | 200 |

I claim:

1. A process for the production of dry solid molasses comprising adjusting the pH of a liquid molasses with an alkaline agent to from about 8 to about 10.5 followed by drying.

2. A process according to claim 1 wherein the pH adjustment is carried out at a temperature of from about 60° to about 70° C.

3. A process according to claim 1 wherein the pH is adjusted to from about 8.5 to about 10.5.

4. A process according to claim 1 wherein the molasses is selected from the group consisting of beetroot and sugar-cane molasses.

5. A process according to claim 1 wherein the pH is adjusted by adding to said molasses an aqueous suspension of calcium hydroxide.

6. A process according to claim 5 wherein said calcium hydroxide has a particle size of about 150 mesh.

7. A process according to claim 1 wherein said liquid molasses is dried by spray-drying.

8. A process according to claim 7 wherein said liquid molasses, after said pH adjustment, and prior to said spray drying is adjusted to contain 70% by weight of solids.

9. A process according to claim 1 wherein said dried product is neutralized to a pH of from about 6.8 to about 7.2 by the addition thereto of an acidic agent.

10. A process according to claim 9 wherein said acidic agent is selected from the group consisting of monocalcium phosphate and phosphoric acid.

References Cited
UNITED STATES PATENTS

| | | | |
|---|---|---|---|
| 2,105,745 | 1/1938 | Lewis | 99—6 X |
| 1,983,434 | 12/1934 | Black | 99—6 X |
| 2,991,179 | 7/1961 | Kviesitis | 99—6 |
| 2,967,106 | 1/1961 | Kviesitis | 99—6 |

MORRIS O. WOLK, Primary Examiner

S. MORANTZ, Assistant Examiner

U.S. Cl. X.R.

127—29, 58